(12) United States Patent
Hu et al.

(10) Patent No.: US 8,639,936 B2
(45) Date of Patent: Jan. 28, 2014

(54) METHODS AND ENTITIES USING IPSEC ESP TO SUPPORT SECURITY FUNCTIONALITY FOR UDP-BASED TRAFFIC

(75) Inventors: Zhiyuan Hu, Shanghai (CN); Zhikun Wan, Shanghai (CN); Zhigang Luo, Shanghai (CN); Ping Huang, Shanghai (CN)

(73) Assignee: Alcatel Lucent, Paris (FR)

( * ) Notice: Subject to any disclaimer, the term of this patent is extended or adjusted under 35 U.S.C. 154(b) by 517 days.

(21) Appl. No.: 12/736,251

(22) PCT Filed: Mar. 25, 2008

(86) PCT No.: PCT/CN2008/000580
§ 371 (c)(1),
(2), (4) Date: Sep. 24, 2010

(87) PCT Pub. No.: WO2009/117844
PCT Pub. Date: Oct. 1, 2009

(65) Prior Publication Data
US 2011/0016314 A1 Jan. 20, 2011

(51) Int. Cl.
*H04L 29/06* (2006.01)
(52) U.S. Cl.
USPC .......................................... 713/182

(58) Field of Classification Search
USPC .......................................... 713/182
See application file for complete search history.

(56) References Cited

U.S. PATENT DOCUMENTS

| 2005/0018472 A1* | 1/2005 | Lim | 365/154 |
| 2005/0076216 A1* | 4/2005 | Nyberg | 713/171 |
| 2005/0265366 A1* | 12/2005 | Ejiri | 370/401 |
| 2006/0062384 A1* | 3/2006 | Dondeti | 380/44 |
| 2007/0186100 A1* | 8/2007 | Wakameda | 713/160 |
| 2009/0043901 A1* | 2/2009 | Mizikovsky et al. | 709/229 |

* cited by examiner

*Primary Examiner* — Michael S McNally
(74) *Attorney, Agent, or Firm* — Carmen Patti Law Group, LLC

(57) ABSTRACT

Methods in OMA SEC_CF for providing security services to traffic over UDP between a client and a server and the relevant entities are provided. A pre-shared key is pre-shared between the client and the server. A pair of IPSec ESP SAs between the client and the server is established without shared key negotiation, wherein traffic data cryptographic algorithms are determined. Traffic data security keys are derived from the pre-shared key via the determined traffic data cryptographic algorithms. Then, data of the traffic can be provided with security services with the traffic data security keys through use of IPSec ESP.

15 Claims, 4 Drawing Sheets

METHODS AND ENTITIES USING IPSEC ESP TO SUPPORT SECURITY FUNCTIONALITY FOR UDP-BASED TRAFFIC

FIELD OF THE INVENTION

The present invention relates to SEC_CF (Security Common Function over application layer) in OMA (Open Mobile Alliance), and more particularly to methods and function entities for supporting security functionality for UDP-based OMA enablers.

BACKGROUND OF THE INVENTION

The Security Common Functions (SEC_CF) over application layer in OMA aims to provide a common set of security mechanism that can be re-used by OMA enablers. The rationale behind this SEC_CF is to avoid, where possible, duplication of security effort for each OMA Enabler that requires security functionality. SEC_CF offers to re-use both the architectural entities (e.g. Security Gateways, etc) and security specifications (e.g. protocol profiles) when developing new OMA enablers. OMA enablers typically comprise of protocols, such as MLP (Mobile Location Protocol), RLP (Roaming Location Protocol), PCP (Privacy Checking Protocol) in the Location enabler, SSI (Server-to-Server Interface) and CSI (Client-to-Server Interface) in the Presence enabler, SyncML in Device Management, or PAP (Push Access Protocol), which is used by multiple enablers.

The current version of the SEC_CF, i.e. Security Common Function Version 1.0 (referred to as SEC_CF v1.0 hereinafter), is designed to provide security functionality only for OMA enablers that operate over TCP as the transport protocol, not for those OMA enablers over UDP, such as enabler CPM (Converged IP Messaging). Since OMA SEC_CF v1.0 using TLS/PSK-TLS to provide security functionality, it is not applicable for those OMA enablers over UDP.

Although the user plane security can reuse the media security in 3GPP, the development of the related media security standards are too late and CPM could not wait, since these media security standards are not ready yet. Therefore, it is very urgent to improve SEC_CF and make it applicable for those OMA enablers that operate over UDP as the transport protocol.

Considering ESP (Encapsulating Security Payload) which specified by RFC 4303 is a key protocol in the IPsec (Internet Security) architecture, which is capable of providing confidentiality and integrity for both TCP and UDP, we believe IPSec ESP is the best choice to be utilized for supporting security functionality for UDP-based OMA enablers. Data Integrity herein refers to a security service that protects against unauthorized changes to data, including both intentional change or destruction and accidental change or loss, by ensuring that changes to data are detectable. Data Confidentiality herein refers to the property that a particular data item or information (usually sent or received as part of the content of a "secured" message, or else constructed on the basis of exchanged data) is not made available or disclosed to unauthorized individuals, entities, or processes, and remains unknown to the intruder.

In the existing IPSec ESP, before providing security service for the traffic data, a secure communication channel between the initiator and the responder must be established via a security association (SA) set-up procedure. The general SA set-up procedure is designed based on an assumption that the two endpoints of the secure communication channel, i.e. the initiator and the responder, are strange to each other, and thus takes a complicated procedure to set up SA. (More details on the general SA set-up procedure will be described later with reference to FIG. 2)

However, in OMA SEC_CF, the two endpoints of the secure communication channel are not completely strange to each other. In other words, the two endpoints may known each other via some other security mechanisms previously, such as via an authentication and key agreement in underlying network infrastructure. Thereby, the general procedure to set up SA according to the prior art is unefficient for adapting IPSec ESP to current OMA SEC_CF.

Thus, it would be an advancement in the art to adapt IPSec ESP to current OMA SEC_CF v1.0 to make SEC_CF useful for enablers based on UDP, in a manner that attempts to optimize the SA set-up procedure and protocol efficiency.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In view of the above, an objective of the invention is to solve or at least reduce the problems discussed above. In more particular, a purpose of the invention is to provide methods and devices using IPSec ESP to support confidentiality and integrity for UDP-based OMA enablers, in a manner that attempts to optimize the SA set-up procedure and protocol efficiency.

Generally, the above objectives are achieved by methods for providing confidentiality and integrity for UDP-based OMA enablers by using IPSec ESP, and an apparatuses, device and system according to the attached independent patent claims.

According to one aspect of the invention, a method in a client for providing security services to traffic over UDP in OMA SEC_CF, between the client and a server in OMA SEC_CF is provided. The method comprises establishing a pair of IPSec ESP SAs without shared key negotiation, wherein traffic data cryptographic algorithms are determined; deriving traffic data security keys from a pre-shared key, via the determined traffic data cryptographic algorithms; and providing security services to data of the traffic with the traffic data security keys through use of IPSec ESP.

According to another aspects of the invention, a method in a server for providing security services to traffic over UDP in OMA SEC_CF, between a client and the server, is provided. The method comprises establishing a pair of IPSec ESP SAs without shared key negotiation, wherein traffic data cryptographic algorithms are determined; deriving traffic data security keys from a pre-shared key, via the determined traffic data cryptographic algorithms; and providing security services to data of the traffic with the traffic data security keys through use of IPSec ESP.

In an exemplary embodiment, the client generating a request message for transmission to the server to initiate an establishment of the IPSec ESP SA, and the request message containing a first set of SA-related parameters including: a receiving SPI and a transmitting SPI assigned by the client for the pair of IPSec ESP SAs, a receiving UDP port and a transmitting UDP port assigned by the client for the traffic, and a list of identifiers for cryptographic algorithms which the client supports. In response to a reception of the request message, the server selecting the traffic data cryptographic algorithms it supports from the list of identifiers for cryptographic algorithms, and generating a response message for transmission to the client, the response message containing a second set of SA-related parameters including: a receiving SPI and a transmitting SPI assigned by the server for the pair of IPSec ESP SAs, a receiving UDP port and a transmitting UDP port assigned by the server for the traffic, and a list of identifiers for the selected cryptographic algorithms.

In an exemplary embodiment, in response to a reception of the response message, the client generating a confirmation message containing a third set of SA-related parameters including the receiving SPI, the transmitting SPI, the receiving UDP port and the transmitting UDP port that are assigned by the client, and the second set of SA-related parameters received in the response message, for transmission to the server. And then, the server check whether or not parameters in the third set of SA-related parameters are identical with corresponding parameters of the first and second set of SA-related parameters.

According to the other aspects of the invention, a client entity and a server client relevant to the method of the invention are provided.

With the solution of the present invention, the confidentiality and integrity mechanism can be provides for UDP-based OMA enablers, allowing the ESP SA being established efficiently, and negating the need of a negotiation for a shared key. Furthermore, the network overhead traffic is decreased by embedding only necessary SA-related parameters to service access messages for delivery, rather than delivering all SA-related parameters in the general SA set-up messages.

Those of skill in the art will appreciate that the above is merely an introduction to the subject matter described in more detail below. Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

A more complete understanding of the present invention and certain advantages thereof may be acquired by referring to the following description in consideration of the accompanying drawings, in which like reference numbers indicate like features, and wherein.

DETAILED DESCRIPTION OF THE INVENTION

In the following description of the various illustrative embodiments, reference is made to the accompanying drawings, which form a part hereof, and in which are shown by way of illustration various example embodiments in which the invention may be practiced. It is to be understood that other embodiments may be utilized and structural and functional modifications may be made without departing from the scope of the present invention.

Figure 1:
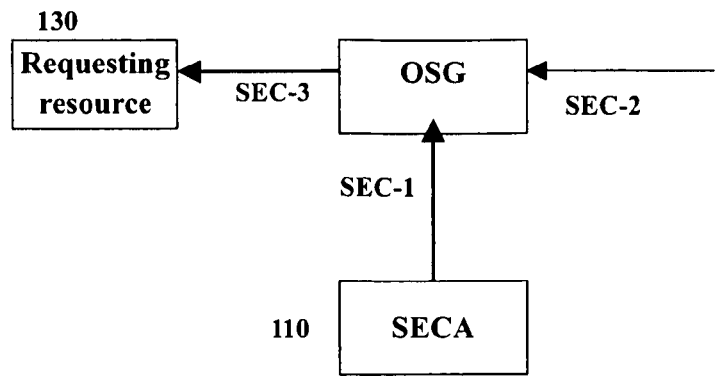
FIG. 1 is a schematic illustration of an OMA SEC_CF architecture in which the present invention may be implemented.

FIG. 1 illustrates an OMA SEC_CF architecture in which the present invention may be implemented. The basic structure and operation of the OMA SEC_CF architecture are in accordance with OMA SEC_CF v1.0, which is incorporated herein by reference in its entirety. Since they are known to one skilled in the art, only the details relevant to the present solution are discussed in detail.

SECA (Security Agent) 110 and OSG (OMA Security Gateway) 120 is a functional entity which can be integrated into the functional entities of the OMA Enabler architecture in order to provide security services. The OMA enabler supported by the SECA and OSG operates in a Client-Server model. For example, the SECA can be implemented in the client and the OSG can be implemented in the server of the OMA enabler.

An application or a user can interact with a requesting resource of an OMA enabler through SECA 110. In the case of a user this may be done through a user interface (UI). The SECA may be implemented in a Mobile Terminal which may include a removable security token such as a (U)SIM/R-UIM. However, the SECA may also be implemented in application servers without a removable security token. Generally in the SEC_CF, the SECA acts on behalf of the user and all identifiers in the SECA are bound to the user (subscriber) identities.

The OSG can provide all security services defined in the SEC_CF, such as authentication, confidentiality and integrity protection, for any requesting resource that makes use of the SEC_CF. The OSG can be integrated into the resource utilizing SEC_CF or it can deployed as a separate entity that can provide services to a number of resources that can be reached via an OSG.

Requesting resource 130 can be the traffic provider of the OMA enabler, and it is connected to OSG 120 via an interface SEC-3 in cases where the OSG is not fully integrated into the requesting resource.

SECA 110 interfaces with the OSG 120, which may be either Home OSG or visited OSG, via the interface SEC-1. Currently SEC_CF only supports TCP as the transport protocol for SEC-1. However, with the solution of the present invention, if a requesting resource selects an application specific protocol to be implemented over UDP in a Client-Server model, then that protocol can be secured using the security mechanisms implemented by an improved SEC-1. However, details about the operation of the SECA and OSG will be given later with reference to FIG. 6.

Figure 2:
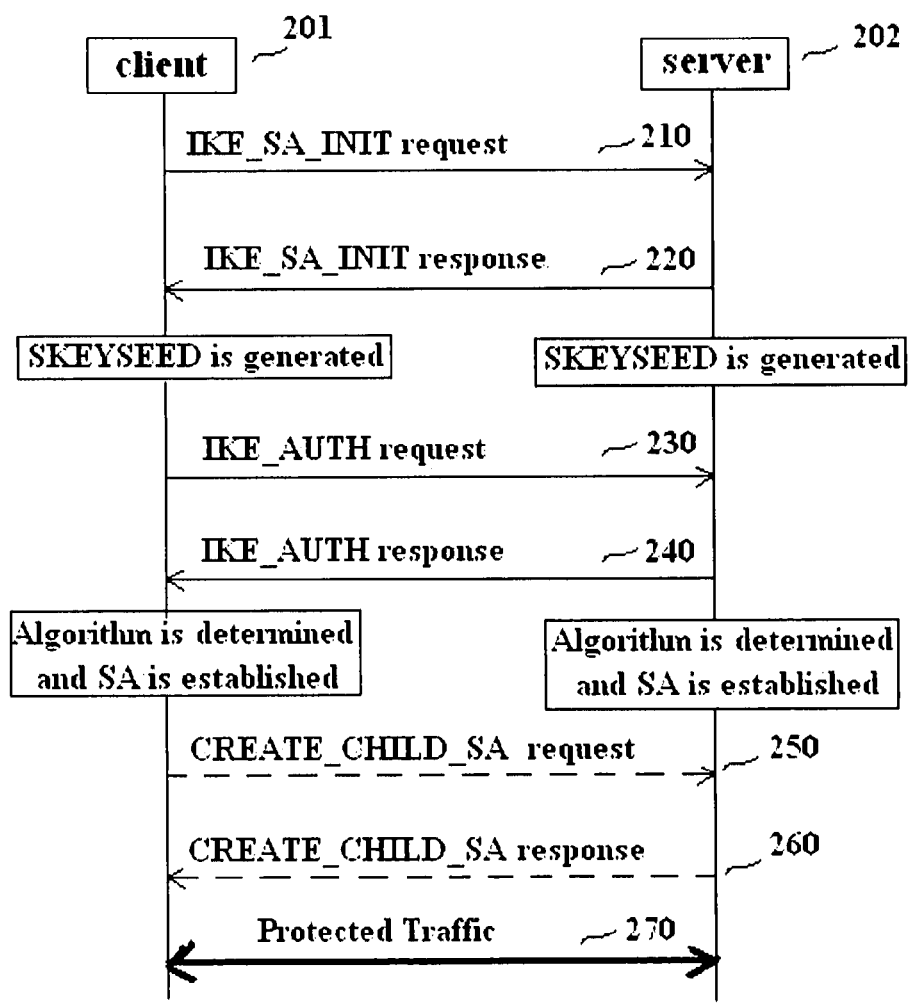
FIG. 2 is a flow chart, which illustrates a general SA set-up procedure according to the prior art.

Referring to FIG. 2, a general SA set-up procedure for IPSec ESP according to the prior art will now be described. In order to set up a pair of IPSec ESP SA, at least four general messages must be transferred between the client and the server. They are IKE_SA_INIT request message 210, IKE_SA_INIT response message 220, IKE_AUTH request message 230 and IKE_AUTH response message 240. The IKE_SA_INIT request message 210 and IKE_SA_INIT response message 220 are used mainly to negotiate a shared key SKEYSEED shared between the client and the server. The SKEYSEED is a key from which all of the traffic data security keys for providing security service for traffic data can be derived. The mainly purposes of the IKE_AUTH request message 230 and IKE_AUTH response message 240 are negotiating cryptographic algorithms which will be used to derive the traffic data security keys for providing security service for traffic data from the shared key, and performing mutual authentication in transmission layer between the client and the server.

As mentioned above, since the general SA set-up procedure is designed based on an assumption that the initiator and the responder, i.e. the client and the server, are strange to each other, a key agreement procedure must be performed via the IKE_SA_INIT request message and IKE_SA_INIT response message. In other words, since there is no available shared key which is pre-shared between the client and the server as they are stranger, the IKE_SA_INIT request message and IKE_SA_INIT response message is transferred therebetween before the exchanging of the IKE_AUTH request message and IKE_AUTH response message.

When an authentication for service access is necessary, the other two messages: CREATE_CHILD_SA request message 250 and CREATE_CHILD_SA response message 260 are used after the above four messages 210-240 to establish a child SA.

The general SA set-up procedure according to the prior art is further described in RFC 4301 and RFC 4306 that are available at http://www.ieff.org/rfc/rfc4301.txt, and http://www.ieff.org/rfc/rfc4306.txt respectively, and they are incorporated herein by reference in their entirety.

Thereby, the pair of SAs between the client and the server is established, and then traffic data security keys can be derived from the shared key SKEYSEED via the negotiated cryptographic algorithms. Thereafter, the traffic data transferred between the client and the server can be protected (denoted as 270) with the derived traffic data security keys.

Thus it can be seen that there can be six messages for the general SA set-up procedure, resulting in a mass of overhead for the traffic.

Figure 4:
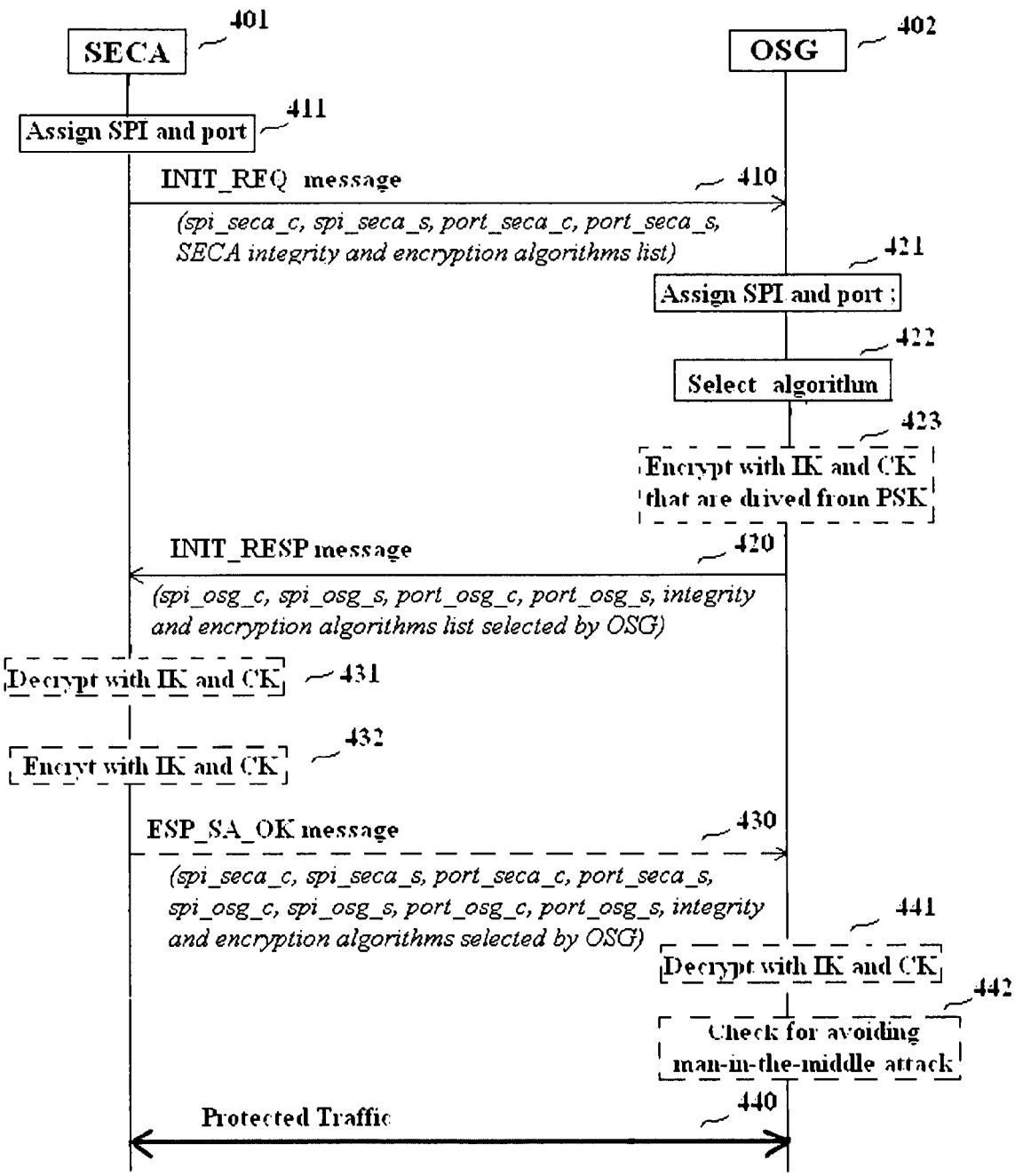
FIG. 4 is a flow chart, which illustrates another example of the SA set-up procedure according to one or more illustrative aspects of the invention.

Examples of the SA set-up procedure according to one or more illustrative aspects of the invention will be described later with reference to FIGS. 4-6. In the following, a confidentiality mechanism and an integrity mechanism will be used as one example of an attempt to provide security service to the traffic, but other types of security mechanism such as connectionless integrity, an anti-replay service, and limited traffic flow confidentiality are also possible.

The basic idea of the present invention is that the traffic data keys, such as an integrity key IK for integrity mechanism and an encryption key CK for confidentiality mechanism, can be derived from a pre-shared key $PSK_{SECCK}$ using suitable cryptographic algorithms (to be described later). The pre-shared key is a key shared between the SECA and the OSG at any time before the pre-shared key is needed in the SA set-up procedure. The derivation of IK and CK on the user side is done in the SECA. The derivation of IK and CK on the network side is done in the OSG.

The pre-shared key $PSK_{SECCF}$ can be pre-set by someone, for example a service provider, a product vendor, or a network operator, etc. The client and the server can obtain the pre-set $PSK_{SECCF}$ directly from a Key Management Center (KMC), for example. Alternatively and/or additionally, the pre-shared key $PSK_{SECCF}$ can be established as a result of an authentication and key agreement procedure (e.g. UMTS AKA, IMS AKA, GBA etc.) in network control layer or network application layer or network transmission layer. For example, $PSK_{SECCF}$ can be obtained as a result of a GBA procedure, as described in detail in "3GPP TS33.220" and "3GPP2 S.S0109" which are available at http://www.3gpp.org and http://www.3gpp2.org respectively. Another example is that $PSK_{SECCF}$ the can be derived from the result of the authentication and key agreement procedure of network access.

Traditionally, the cryptographic algorithms used for integrity mechanism in IPSec ESP, referred to as integrity algorithm, comprise but not limited to HMAC-MD5-96 and HMAC-SHA-1-96. It should be understand those integrity algorithms are not critical for the invention and there are other suitable cryptographic algorithms applicable to the invention. If the selected integrity algorithm is HMAC-MD5-96, then the integrity key for integrity mechanism, denoted as $IK_{SECCF\_ESP}$, can be derived from:

$$IK_{SECCF\_ESP}=\text{HMAC-SHA-256}(PSK_{SECCF},\text{"OMA SECCF IK"}),$$

where "OMA SECCF IK" is a character string used for differing the integrity key from the encryption key.

If the selected integrity algorithm is HMAC-SHA-1-96, then $IK_{SECCF\_ESP}$ can be derived from HMAC-SHA-256 ($PSK_{SECCF}$, "OMA SECCF IK") by appending 32 zero bits to the end of HMAC-SHA-256 (PSKSECCF, "OMA SECCF IK") to create a 160-bit string.

Traditionally, the cryptographic algorithms used for confidentiality mechanism in IPSec ESP, referred to as encryption algorithm hereinafter, comprise but not limited to DES-EDE3-CBC and AES-CBC. It should be understand those encryption algorithms are not critical for the invention and there are other encryption algorithms applicable to the invention.

If the selected encryption algorithm is AES-CBC, then the encryption key for encryption mechanism, denoted as $CK_{SECCF\_ESP}$, can be derived from:

$$CK_{SECCF\_ESP}=CK_{temp}=\text{HMAC-SHA-256}(PSK_{SECCF},\text{"OMA SECCF CK"}),$$

wherein, "OMA SECCF CK" is a character string used for differing the encryption key from the integrity key.

If the selected encryption algorithm is DES-EDE3-CBC, then $CK_{SECCF\_ESP}$ can be defined to be:

$$CK_{SECCF\_ESP}=CK_{temp1}\|CK_{temp2}\|CK_{temp1},$$

after adjusting parity bits to comply with RFC 2451, and wherein $CK_{temp1}$ and $CK_{temp2}$ are two blocks of 64 bits each divided from $CK_{temp}$:

$$CK_{temp}=CK_{temp1}\|CK_{temp2}.$$

Figure 3:
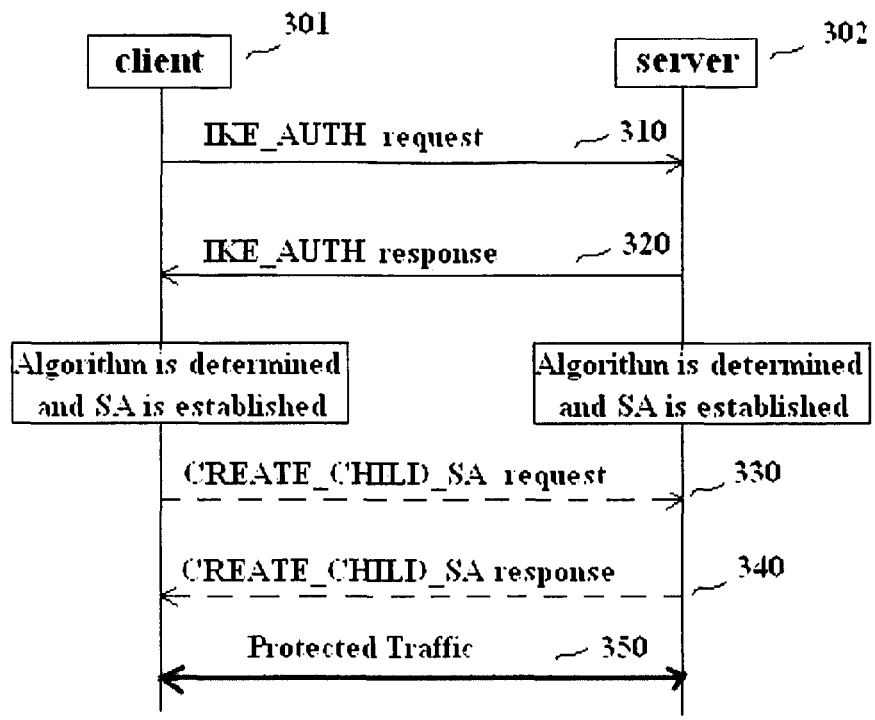
FIG. 3 is a flow chart, which illustrates an example of the SA set-up procedure according to one or more illustrative aspects of the invention.

FIG. 3 illustrates an SA set-up procedure according to one embodiment of the invention. In the embodiment of FIG. 3, steps 310-350 can be performed similar to the corresponding steps 230-270 of FIG. 2.

The algorithm combination of integrity and confidentiality algorithms which will be used to derive the traffic data security keys for providing security service from the pre-shared key can be determined through the IKE_AUTH request message 310 and IKE_AUTH response message 320. Thereby, the pair of SAs between the client and the server is established, and then traffic data security keys (i.e. $IK_{SECCF\_ESP}$ and $CK_{SECCF\_ESP}$) can be derived from the pre-shared key via the determined integrity and encryption algorithms.

Similar to the general SA set-up procedure, when an authentication for service access is necessary, the other two messages: CREATE_CHILD_SA request message 330 and CREATE_CHILD_SA response message 340 can be used after the above two messages 310-320 to establish a child SA. Thereafter, the traffic data transferred between the client and the server can be protected (denoted to 350) with the derived $IK_{SECCF\_ESP}$ and $CK_{SECCF\_ESP}$.

In contrast to the general SA set-up procedure shown in FIG. 2, in the solution of the present invention, the steps corresponding to IKE_SA_INIT request message 210 and IKE_SA_INIT response message 220 are deleted. This is because a pre-shared key as has been discussed above can be obtained and serve as the shared key SKEYSEED, which should be negotiated through the steps corresponding to IKE_SA_INIT request message 210 and IKE_SA_INIT response message 220 in the general SA set-up procedure. Without the shared key negotiation, i.e. IKE_SA_INIT request message 210 and IKE_SA_INIT response message 220, the data need to be transferred between the client and the server can be reduced. It is particularly of benefit to the traffic-sensitive application and system, for example the service charged by traffic and the wireless communication system.

The other preferred embodiments of the IPSec ESP SA set-up procedure according to the invention will now be described in detail with reference to FIGS. 4 and 5. In the embodiments of FIGS. 4 and 5, the messages involved in the embodiment of FIG. 3 are combined, so that the SA-related parameters are embedded into the messages for service access, to ensure only necessary SA-related parameters are transferred between the SECA and the OSG.

The service access messages containing only necessary SA-related parameters, instead of all SA-related parameters in messages of the general SA set-up procedure as specified in RFC 4306, are defined. For example, the KEi field as specified in RFC 4306 are not necessary to be exchanged in the present invention. Thereby, the overhead traffic between the SECA and the OSG can be reduced and the ESP SA establishment also can be simplified.

In order to initiate an IPSec ESP SA set-up procedure for a pair of SAs to be used for traffic data reception and transmission between SECA 401 and OSG 402, SECA 401 generates a message INIT_REQ, and sends it to OSG at step 410.

The INIT_REQ message contains the following SA-related parameters:
the SPIs (Security Parameter Index) assigned by SECA (i.e., spi_seca_c, spi_seca_s)
the protected ports assigned by SECA (i.e., port_seca_c, port_seca_s)
a list of identifiers for the integrity and encryption algorithms, which the SECA supports (i.e. SECA integrity and encryption algorithms list).

For generating message INIT_REQ, SECA 401 can define the pair of SPIs denoted as spi_seca_s and spi_seca_c, which are unique and different from any SPIs that might be used in any existing SAs, at block 411. At block 411, SECA 401 can also associate two ports with each of the IPSec ESP SA to be established. For the traffic of the OMA enabler over UDP, the SECA will receive traffic data protected with ESP on the port port_seca_s (the protected server port) and send traffic data protected with ESP on the port port_seca_c (the protected client port).

After receiving the INIT_REQ message, OSG 402 temporarily stores the parameters received in this message in local security association database (SAD), and generates a message INIT_RESP as response to message INIT_REQ.

The INIT_RESP message contains:
the SPIs assigned by OSG 402 (i.e., spi_osg_c, spi_osg_s)
the protected ports assigned by OSG 402 (i.e., port_osg_c, port_osg_s)
a list of identifiers for the integrity and encryption algorithms selected by OSG.

OSG 402 can define (block 421) a pair of SPIs (denoted as spi_osg_s and spi_osg_c) that are unique and different from any SPIs as received from SECA 401. The OSG also associates (block 421) two ports (denoted as port_osg_s and port_osg_c) with each of IPSec ESP SAs to be established. For the traffic of the OMA enabler over UDP, the OSG will receive traffic data protected with ESP from the SECA on the port port_osg_s (the protected server port), and send requests and responses protected with ESP to a SECA on the port port_osg_c (the protected client port).

The OSG can also determine (block 422) the integrity algorithm and the encryption algorithm to be used from the received list of integrity and encryption algorithms from the SECA. The determination can be performed by ordering a list of integrity and encryption algorithms the OSG itself supports by priority, and selecting the first algorithm combination in the OSG's own algorithm list supported also by the SECA. If the SECA did not put any the encryption algorithm in the INIT_REQ message, or no encryption algorithm supported by both the SECA and the OSG is found, then the OSG can either select the NULL encryption algorithm or abort the procedure, depending on its security policy on confidentiality.

Then, the OSG can send INIT_RESP message to the SECA at step 420. After that, the OSG then can add a new pairs of SAs with the SA-related parameters negotiated, comprising spi_seca_c, spi_seca_s, spi_osg_c, spi_osg_s, port_seca_c, port_seca_s, port_osg_c, port_osg_s and the list of identifiers for the integrity and encryption algorithms selected by OSG, into the local SAD.

After the reception of the INIT_RESP message, the SECA can adds a new pairs of SAs with the SA-related parameters negotiated, comprising spi_seca_c, spi_seca_s, spi_osg_c, spi_osg_s, port_seca_c, port_seca_s, port_osg_c, port_osg_s and the list of identifiers for the integrity and encryption algorithms selected by OSG, into the local SAD.

In this example, the authentication between the OSG and SECA, i.e. data original sender and receiver authentication in transmission layer which generally involves checking IP address and port, reuses the authentication and key agreement procedure from which the pre-shared key is obtained, e.g. underlying network access authentication.

Thus the pair of IPSec ESP SAs is established. In both the OSG and the SECA, a same integrity key $IK_{SECCF\_Esp}$ can be derived from a $PSK_{SECCF}$ via the selected integrity and encryption algorithm, and a same encryption key $CK_{SECCF\_ESP}$ can be derived from the $PSK_{SECCF}$ via the selected encryption algorithm. Thereby, the traffic associated with the SA pair can be protected by ESP integrity and confidentiality mechanisms.

In a prefer embodiment of the invention, the content of the INIT_RESP message to be sent to the SECA, excluding the list of identifiers for the integrity and encryption algorithms selected by OSG, can be protected by integrity and encryption algorithm with the integrity key $IK_{SECCF\_Esp}$ and the encryption key $CK_{SECCF\_ESP}$, as shown in block 423. This means the OSG must get the pre-shared key $PSK_{SECCF}$ before sending the INIT_RESP message. Thus, after the reception of the INIT_RESP message, the SECA need firstly to derived integrity key $IK_{SECCF\_ESP}$ and the encryption key $CK_{SECCF\_ESP}$ with $PSK_{SECCF}$ through the integrity and encryption algorithms selected by OSG, and decrypt (block 431) the received INIT_RESP message with the derived $IK_{SECCF\_ESP}$ and $CK_{SECCF\_ESP}$.

In the case where the authentication between the OSG and SECA does not reuse the authentication and key agreement procedure, the OSG can put an authentication code, such as the AUTH field specified in RFC 4306, into the INIT_RESP message, so that the OSG can be authenticate by the SECA in transmission layer.

Preferably, the SECA authenticate the OSG in transmission layer with a certificate containing a public key. Thus, the certificates-related parameters such as the CERT field and CERTREQ field specified in RFC 4306 can also be included into the INIT_RESP message.

It is to be note, in the case that mutual authentication between the OSG and the SECA in transmission layer can be conducted through reusing the authentication and key agreement procedure from which the pre-shared key is obtained, as mentioned above, it is not necessary to put the authentication code in the INIT_RESP message.

In yet another prefer embodiment of the invention, the SECA can further generate an ESP_SA_OK message to confirm the successful SA establishment, and send the message to the OSG at step 432, allow avoiding man-in-the-middle-attacks. The ESP_SA_OK message contains:

the SPIs assigned by the SECA and OSG (i.e., spi_seca_c, spi_seca_s, spi_osg_c, spi_osg_s)
the ports assigned by the SECA and OSG (i.e., port_seca_c, port_seca_s, port_osg_c, port_osg_s)
the list of identifiers for the integrity and encryption algorithms selected by OSG.

The content of the ESP_SA_OK message is be protected by integrity and encryption function with the integrity key $IK_{SECCF\_ESP}$ and the encryption key $CK_{SECCF\_ESP}$, as shown in step 432. This means the SECA must get the pre-shared key $PSK_{SECCF}$ before sending this message.

After receiving message INIT_RESP from the SECA, the OSG can decrypted (block 441) the protected content of message INIT_RESP with $IK_{SECCF\_ESP}$ and $CK_{SECCF\_ESP}$ generated in OSG 402. The OSG also checks whether the selected integrity and encryption algorithms list, spi_osg_c, spi_osg_s, port_osg c, and port_osg_s received in message ESP_SA_OK are identical with the corresponding parameters sent in message INIT_RESP. The OSG further checks whether spi_seca_c, spi_seca_s, port_seca_c, and port_seca_s received in message ESP_SA_OK are identical with those received in message INIT_REQ. If these checks (denoted commonly as block 442) are all successful, the IPSec ESP SAs is established. Otherwise, the ESP SA set-up procedure is aborted.

In the embodiment discussed above in which the OSG put an authentication code, such as the AUTH field specified in RFC 4306, into the INIT_RESP message, to allow the OSG being authenticate by the SECA in transmission layer, the SECA can also put an authentication code, as the AUTH field specified in RFC 4306, into the ESP_SA_OK message, so that the SECA can be authenticate by the OSG in transmission layer. Preferably, the OSG authenticate the SECA in transmission layer with the pre-shared key.

Figure 5:
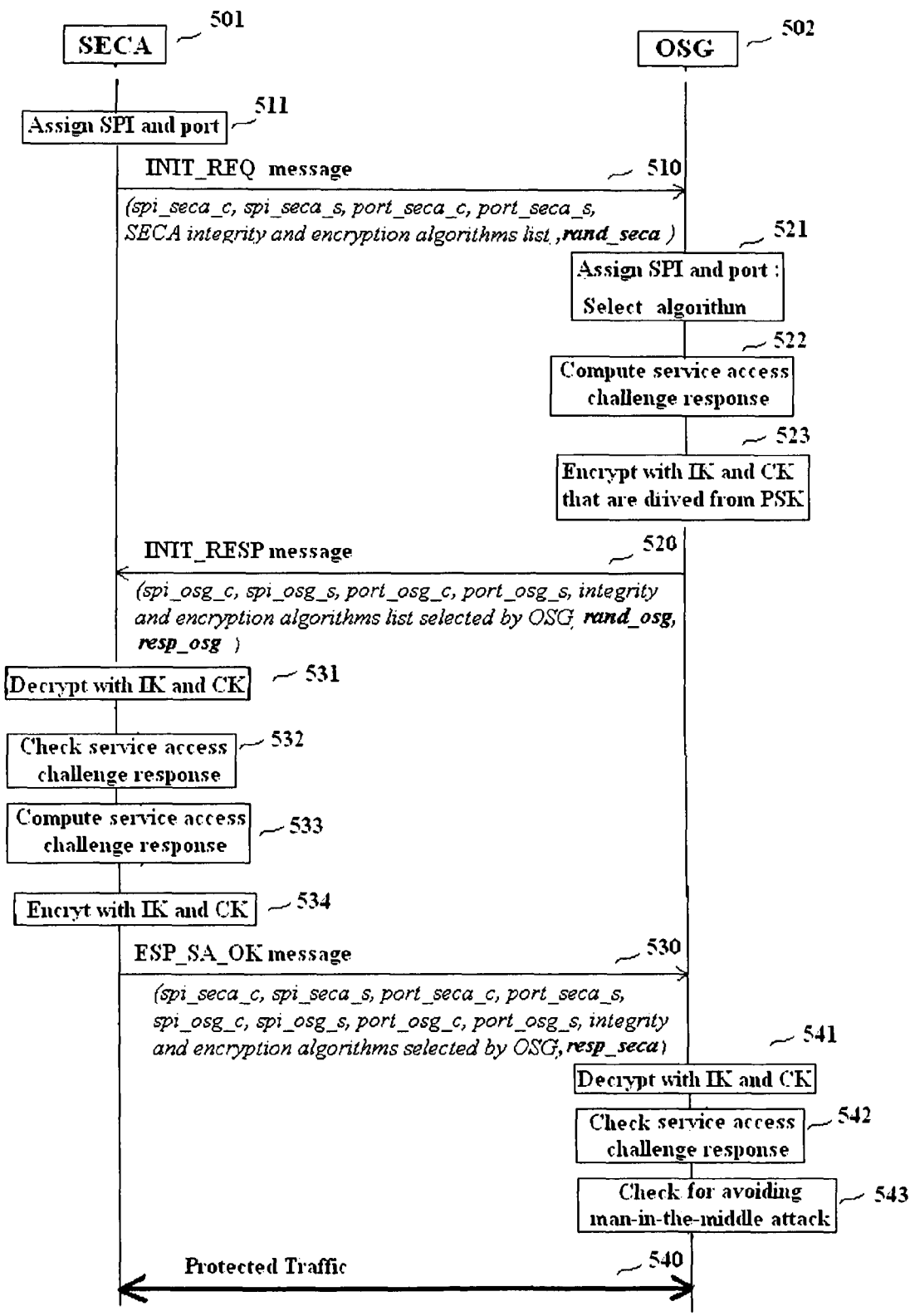
FIG. 5 is a flow chart, which illustrates another example of the SA set-up procedure according to one or more illustrative aspects of the invention.

FIG. 5 illustrates another prefer example of the SA set-up procedure according to one or more illustrative aspects of the invention, in which the service access authentication is embedded in the SA set-up procedure of the invention. The service access authentication is used to challenge the user of the device (e.g. the OSG or SECA), for example, to confirm whether the user of the device is the legal user to access the desired service provided by the OMA enabler.

At step 510, the SECA put a challenge random, denoted as rand_seca, into the INIT_REQ message to authenticate the user of the OSG (referred to as user-OSG) for accessing the desired service. Then, after receiving message INIT_REQ, the OSG compute (block 522) a challenge response (denoted as resp_osg) corresponding to challenge random rand_seca, with a Hash function:

$$resp\_osg = HASH(rand\_seca, \text{an challenge key of the user-OSG}),$$

where, HASH( ) denote a HASH function such as MD5, SHA-1, SHA-256; the challenge key of the user is the password the user used to access the desired service. The challenge key can be the Pre-shared key or other key.

Then, at step 520, the OSG put resp_osg and put another challenge random denoted as rand_org, into the INIT_RESP message to authenticate the user of the SECA (referred to as user-SECA) for accessing the desired service. After receiving message INIT_RESP, the SECA checks (block 532) whether or not the received resp_osg is correct, compute (block 533) a challenge response (denoted as resp_seca) corresponding to the challenge random rand_org, with a Hash function:

$$resp\_seca = HASH(rand\_osg, \text{the challenge key of the user-SECA}).$$

Then, at step 530, put the second challenge response to the second challenge random into the ESP_SA_OK message. After receiving message ESP_SA_OK, the OSG checks (block 541) whether or not the received resp_osg is correct.

Thereby, the service access authentication can be performed efficiently, in contrast to the necessity of CREATE_CHILD_SA request message and CREATE_CHILD_SA response message in the general SA set-up procedure of FIG. 2.

The schematic functional block diagram of the function entity 600 in which one or more embodiments of the invention can be implemented is described with reference to FIG. 6. Although in the above descriptions of the embodiments illustrated in FIGS. 3-5, the SECA is taken as the client entity in the client-server model and the OSG is taken as the server entity, it is recognized by one of ordinary skill in the art that the OSG can be taken as the client entity and the SECA can be taken as the server entity, since the SA set-up procedure can be initiated be either SECA or OSG. Thus, in the point of the security function relevant to the present invention, the functional blocks of the SECA and the OSG are identical. Therefore, the schematic functional block diagram is shown in FIG. 6 is applicable to both the SECA and the OSG, and the difference only lies in different configurations.

Figure 6:
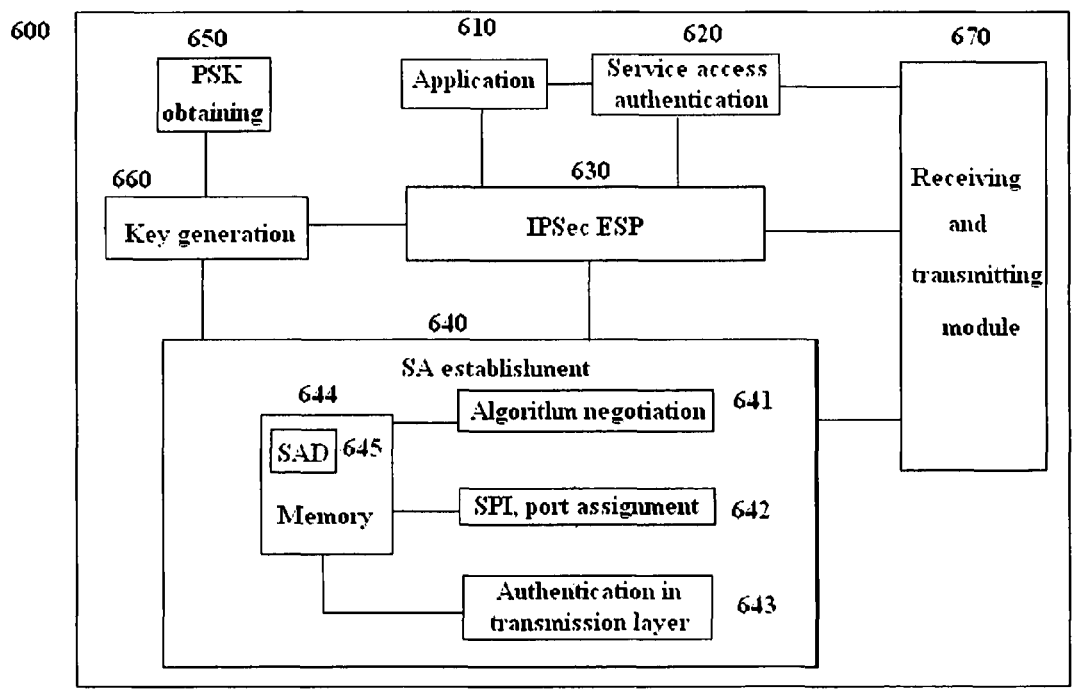
FIG. 6 is a schematic functional block diagram illustrating a function entity according to one embodiment.

As seen in FIG. 6, the function entity 600 has a SA establishment block 640 which is responsible for the operation of the SA set-up procedure. Specially, block 640 comprises sub-block 641 which is responsible for the negotiation of the suitable cryptographic algorithms (310, 320; 410, 420, 421, 422; 510, 520, 521), sub-block 642 which can define the SA-related parameters such as the SPI and port (411, 421; 511, 521). The block 640 has an associated memory 644 such as RAM memory, ROM memory, EEPROM memory, flash memory, or any combination thereof. The memory 644 is used for various purpose by the SA establishment block 640, one of them being for storing the SAD 645 in which each entry defines the parameters associated with one SA. Each SA has an entry in the SAD. For each SA, the SAD can maintain, but not limited to, the following data items:

SPIs selected by the two parties of the SA to uniquely identify the SA.
ESP algorithm(s), key(s), etc negotiated for the security service to be used with ESP. For example, the list of identifiers for the integrity and encryption algorithms selected by OSG, and the integrity key $IK_{SECCF\_Esp}$ and the encryption key $CK_{SECCF\_ESP}$.

IPsec protocol mode: tunnel or transport indicating which mode of ESP is applied to traffic on this SA.

UDP ports to be used with ESP applied to traffic on this SA.

In the case of the mutual authentication in transmission layer is necessary, block 640 also includes a sub-block 643 which is responsible for that operation as described above.

The application block 610 handles various aspects of conventional the application provide be OMA enabler, such as Converged IP Messaging. Traffic data of the application, e.g. receiving and announcing incoming calls, generating and forwarding outgoing calls, are delivered to IPSec ESP block 630 for providing integrity and confidentiality protections (350, 440, 540). Block 630 can also provide integrity and confidentiality protections for the data involved in the SA set-up procedure, as described above (423, 431, 432, 441; 523, 531, 534, 541).

In the case of the service access authentication being embedded into the SA set-up procedure, function entity 600 also has a service access authentication block 620 for handling the challenge for service access, e.g. generating challenge random, responding to the challenge and check the challenge response, in connection with the SA set-up procedure as described above, (522, 532).

The PSK obtaining block 650 is responsible to obtain the pre-shared key and provide the pre-shared key to the key generation block 660 to derive the integrity key $IK_{SECCF\_ESP}$ and the encryption key $CK_{SECCF\_ESP}$ via the algorithms negotiated by SA establishment block 640. As discussed above, the pre-shared key can be gotten from KMC as a pre-set key, or can be derived through reusing an authentication and key agreement procedure (e.g. UMTS AKA, IMS AKA, GBA etc.) in network control layer or network application layer or network transmission layer.

The function entity also has a receiving and transmitting block 670 which is responsible to receive and transmit messages containing parameters related to the SA establishment and the traffic data.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output, such as any commercially available CPU (Center Processing Unit) and DSP (Digital Signal Processor). Method steps also may be performed by, and an apparatus may be implemented as, special purpose logic circuitry, e.g., an FPGA (field programmable gate array) or an ASIC (application-specific integrated circuit).

In addition, a storage medium may be provided that includes stored instructions, when executed by a controller or processor that may result in the controller, or other controller or processor, performing one or more of the functions or tasks described above.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

We claim:

1. A method in a client for providing security services to traffic over User Datagram Protocol (UDP) between the client and a server, comprising:
   establishing a pair of Internet Protocol Security (IPSec) Encapsulating Security Payload (ESP) Security Associations (SAs) for UDP traffic without shared key negotiation, wherein traffic data cryptographic algorithms are determined;
   deriving traffic data security keys for traffic over UDP from a pre-shared key, via the determined traffic data cryptographic algorithms; and
   providing security services to data of the traffic over UDP with the traffic data security keys through use of IPSec ESP.

2. The method of claim 1, wherein said establishing the pair of IPSec ESP SAs comprises:
   generating a request message for transmission to the server to initiate an establishment of the IPSec ESP SA, the request message containing a first set of SA-related parameters including:
      a receiving Security Parameter Index (SPI) and a transmitting SPI assigned by the client for the pair of IPSec ESP SAs,
      a receiving UDP port and a transmitting UDP port assigned by the client for the traffic, and
      a list of identifiers for cryptographic algorithms which the client supports; and
   receiving from the server a response message containing a second set of SA-related parameters including:
      a receiving SPI and a transmitting SPI assigned by the server for the pair of IPSec ESP SAs,
      a receiving UDP port and a transmitting UDP port assigned by the server for the traffic, and
      a list of identifiers for the selected cryptographic algorithms.

3. The method of claim 2, wherein said establishing the pair of IPSec ESP SAs further comprises:
   in response to a reception of the response message, generating a confirmation message containing a third set of SA-related parameters including the receiving SPI, the transmitting SPI, the receiving UDP port and the transmitting UDP port that are assigned by the client, and the second set of SA-related parameters received in the response message, for transmission to the server.

4. The method of claim 3, wherein said establishing the pair of IPSec ESP SAs further comprises embedding a first challenge random into the request message to authenticate the server for service access;
   checking a first challenge response received from the server in the response message; and
   embedding a second challenge response corresponding to a second challenge random received from the server in the response message, into the confirmation message.

5. A method in a server for providing security services to traffic over User Datagram Protocol (UDP) between a client and the server, comprising:

establishing a pair of Internet Protocol Security (IPSec) Encapsulating Security Payload (ESP) Security Associations (SAs) for UDP traffic without shared key negotiation, wherein traffic data cryptographic algorithms are determined;

deriving traffic data security keys for traffic over UDP from a pre-shared key, via the determined traffic data cryptographic algorithms; and providing security services to data of the traffic over UDP with the traffic data security keys through use of IPSec ESP.

6. The method of claim 5, wherein said establishing the pair of IPSec ESP SAs comprises:

receiving from the client a request message to initiate an establishment of the IPSec ESP SA, and the request message containing a first set of SA-related parameters including:

a receiving Security Parameter Index (SPI) and a transmitting SPI assigned by the client for the pair of IPSec ESP SAs, a receiving UDP port and a transmitting UDP port assigned by the client for the traffic, and a list of identifiers for cryptographic algorithms which the client supports;

in response to a reception of the request message, selecting the traffic data cryptographic algorithms it supports from the list of identifiers for cryptographic algorithms; and generating a response message for transmission to the client, the response message containing a second set of SA-related parameters including:

a receiving SPI and a transmitting SPI assigned by the server for the pair of IPSec ESP SAs, a receiving UDP port and a transmitting UDP port assigned by the server for the traffic, and a list of identifiers for the selected cryptographic algorithms.

7. The method of claim 6, wherein said establishing the pair of IPSec ESP SAs further comprises:

receiving a confirmation message transmitted in response to the response message from the client, the confirmation message containing a third set of SA-related parameters including the receiving SPI, the transmitting SPI, the receiving UDP port and the transmitting UDP port that are assigned by the client, and the second set of SA-related parameters received in the response message; and checking whether or not parameters in the third set of SA-related parameters are identical with corresponding parameters of the first and second set of SA-related parameters.

8. The method of claim 7, wherein said establishing the pair of IPSec ESP SAs further comprises:

receiving a first challenge random embedded into the request message by the client for service access authenticate;

embedding the first challenge response into the response message, together with a second challenge random for service access authenticate; and checking a second challenge response received from the confirmation message corresponding to the second challenge random.

9. A controller for providing security services to traffic over User Datagram Protocol (UDP) between a client entity and a server entity, comprising at least one processor programmed to perform the steps of:

obtaining a pre-shared key;

establishing a pair of Internet Protocol Security (IPSec) Encapsulating Security Payload (ESP) Security Associations (SAs) for UDP traffic so that traffic data cryptographic algorithms are determined, without shared key negotiation;

deriving traffic data security keys for traffic over UDP from the pre-shared key via the determined traffic data cryptographic algorithms; and providing security services to data of the traffic over UDP with the traffic data security keys through use of IPSec ESP.

10. The controller of claim 9, wherein the at least one processor is further programmed to:

generate a request message for transmission to the server entity to initiate an establishment of the IPSec ESP SA, the request message containing a first set of SA-related parameters including:

a receiving Security Parameter Index (SPI) and a transmitting SPI assigned by the client entity for the pair of IPSec ESP SAs;

a receiving UDP port and a transmitting UDP port assigned by the client entity for the traffic; and a list of identifiers for cryptographic algorithms which the client entity supports; and receive from the server entity a response message containing a second set of SA related parameters including:

a receiving SPI and a transmitting SPI assigned by the server entity for the pair of IPSec ESP SAs;

a receiving UDP port and a transmitting UDP port assigned by the server entity for the traffic; and a list of identifiers for the selected cryptographic algorithms.

11. The controller of claim 10, wherein, the at least one processor is further programmed to:

in response to a reception of the response message, generate a confirmation message containing a third set of SA-related parameters including the receiving SPI, the transmitting SPI, the receiving UDP port and the transmitting UDP port that are assigned by the client, and the second set of SA-related parameters received in the response message, for transmission to the server.

12. The controller of claim 11, wherein the at least one processor is further programmed to:

embed a first challenge random into the request message to authenticate the server entity for service access, check a first challenge response received from the server in the response message; and embed a second challenge response corresponding to a second challenge random received from the server in the response message, into the confirmation message.

13. A controller for providing security services to traffic over User Datagram Protocol (UDP) between a client entity and the server entity, comprising at least one processor programmed to perform the steps of:

obtaining a pre-shared key;

establishing a pair of Internet Protocol Security (IPSec) Encapsulating Security Payload (ESP) Security Associations (SAs) for UDP traffic so that traffic data cryptographic algorithms are determined, without shared key negotiation;

deriving traffic data security keys for traffic over UDP from the pre-shared key via the determined traffic data cryptographic algorithms; and providing security services to data of the traffic over UDP with the traffic data security keys through use of IPSec ESP.

14. The controller of claim 13, wherein the at least one processor is further programmed to:

receive from the client entity a request message to initiate an establishment of the IPSec ESP SA, the request message containing a first set of SA-related parameters including:

a receiving Security Parameter Index (SPI) and a transmitting SPI assigned by the client entity for the pair of IPSec ESP SAs, a receiving UDP port and a transmitting UDP port assigned by the client entity for the traffic, and a list of identifiers for cryptographic algorithms which the client entity supports; and in responses to the reception of the request message, select the traffic data cryptographic algorithms it supports from the list of identifiers for cryptographic algorithms; and generate a response message for transmission to the client entity, the response message containing a second set of SA related parameters including:

a receiving SPI and a transmitting SPI assigned by the server entity for the pair of IPSec ESP SAs, a receiving UDP port and a transmitting UDP port assigned by the server entity for the traffic, and a list of identifiers for the selected cryptographic algorithms.

15. The controller of claim 14, wherein the at least one processor is further programmed to:

receive a confirmation message transmitted in response to the response message from the client, the confirmation message containing a third set of SA-related parameters including the receiving SPI, the transmitting SPI, the receiving UDP port and the transmitting UDP port that are assigned by the client, and the second set of SA-related parameters received in the response message; and check whether or not parameters in the third set of SA-related parameters are identical with corresponding parameters of the first and second set of SA-related parameters.

* * * * *